INVENTOR.
Charles B. Leffert
BY
Warren D. Hill
ATTORNEY

United States Patent Office 3,455,781
Patented July 15, 1969

3,455,781
THERMIONIC ENERGY CONVERTER AND NUCLEAR REACTOR CONTAINING SAME
Charles B. Leffert, Oak Park, Mich., assignor to General Motors Company, Detroit, Mich., a corporation of Delaware
Filed Apr. 20, 1967, Ser. No. 632,352
Int. Cl. G21d 7/00
U.S. Cl. 176—39    8 Claims

ABSTRACT OF THE DISCLOSURE

In a nuclear thermionic converter of the type which uses fission fragments to effect ionization of an interelectrode gas, a one fission fragment range thickness of fissile material is bonded to the collector electrode to provide a source of fission fragments. The emitter electrode is comprised of fissile material also and optionally may be clad with a coating impervious to fission fragments.

---

This invention relates to apparatus for converting nuclear energy to electrical energy and more particularly to thermionic converters of the type using fission fragments for ionizing an interelectrode gas. It has previously been proposed in the United States patent to Jablonski et al. 3,093,567 to convert nuclear energy to electrical energy by a thermionic diode having a uranium bearing emitter electrode spaced from a cooled collector electrode. The interelectrode space is filled with a gas such as a noble gas which is readily ionized by fission fragments emanating from the uranium bearing emitter. The thermionic converter is placed in a nuclear reactor where the neutron flux will effect fissioning of the uranium to produce the fission fragments, and to cause heating of the emitter. The heated emitter then gives off electrons which reach the collector and produce an EMF between the collector and emitter which is useful to do work on an external load. The interelectrode ionized gas or plasma is effective to avoid a space charge being built up between the emitter and collector. It has been found that in this type of device, the maximum current which can be generated is plasma limited, that is, the current is dependent upon the electron density in the ionized gas. It has further been found that fission products from the emitter enter the interelectrode gas and have a deleterious effect so that in some gases, means must be provided to compensate for or remove such fission products.

It is a general object of this invention to provide an improved thermionic converter.

It is a further object of this invention to provide in a thermionic converter, means for providing an interelectrode plasma of high electron density.

It is another object of this invention to provide a thermionic converter having a high current output.

It is an additional object of this invention to provide in a thermionic converter, means for minimizing the amount of undesired fission products in the electrode gas.

The invention is carried out by providing a thermionic converter having a uranium bearing emitter spaced from a collector having a thin film of uranium thereon, the space between the emitter and collector being filled with an ionizable gas.

In an alternative form, the invention is carried out by cladding the emitter with a material impervious to fission fragments.

The above and other advantages will be made more apparent from the following specification taken in conjunction with the accompanying drawings wherein like reference numerals refer to like parts and wherein.

Figure 1:
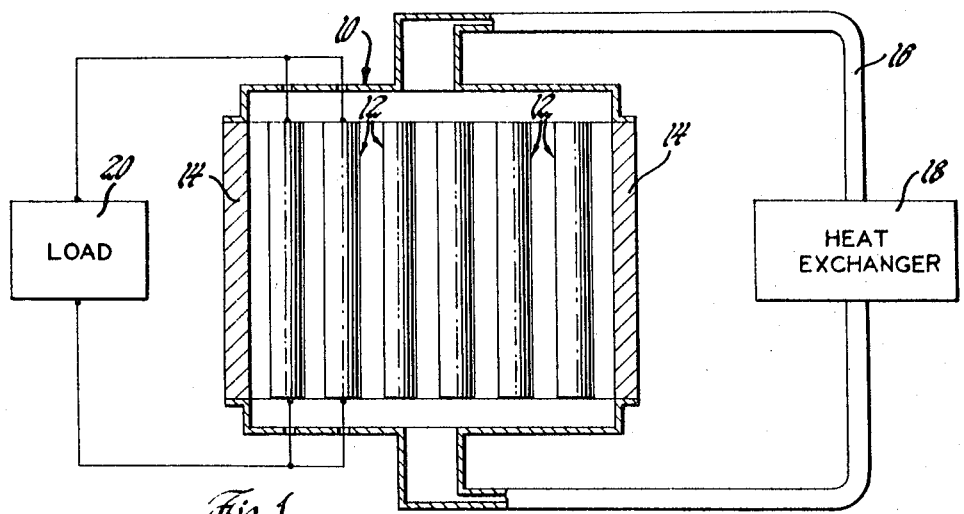
FIGURE 1 is a simplified schematic diagram in cross section of a nuclear reactor to which the present invention may be applied.

In FIGURE 1 the nuclear reactor 10 is schematically shown to include a plurality of cylindrical converter cells or fuel elements 12 positioned inside a vessel having reflective side walls 14. The converter cells 12 are spaced apart to permit circulation of a fluid coolant past the cylindrical surfaces thereof through a circulation path 16. The path 16 includes a heat exchanger 18 which serves to dump the heat picked up by the fluid in passage through the reactor vessel. The converter cells are electrically connected in parallel across a load 20 which utilizes the electrical energy produced by the cells 12. It is to be understood that each of the cells or fuel elements, as shown in detail in FIGURE 2, contains sufficient fissile material such that in the aggregate the total fissile material in the core zone exceeds criticality and hence can sustain a nuclear chain reaction. Suitable control rods may be inserted into the core zone of the reactor 10 to control the rate of nuclear reaction. A more detailed description of a reactor similar to that shown in FIGURE 1 is given in the aforementioned United States Patent No. 3,093,567.

Figure 2:
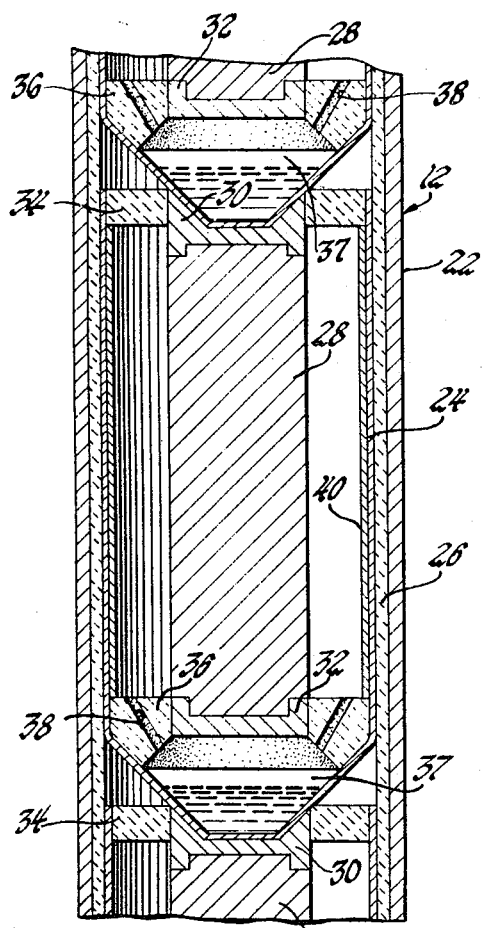
FIGURE 2 is a cross-sectional view of a fuel element of the reactor of FIGURE 1 including a thermionic converter according to this invention.

Referring now to FIGURE 2, one of the converter cells 12 from the array of FIGURE 1 will be described in further detail. Cell 12 is a DC current generating nuclear thermionic fuel element comprising a plurality of series-arranged thermionic diodes. The diodes are arranged end-to-end inside a cylindrical steel casing 22. Each of the diodes includes a cylindrical collector 24 constructed of a conductive material and spaced from the steel casing 22 by a layer of ceramic insulation 26. Concentric with the collector 24 and inwardly spaced therefrom is a cylindrical uranium bearing emitter 28 which rests in upper and lower metallic supports 30 and 32 respectively. Suitable emitter materials are BaO-UO$_2$-W or UC-Re as described in the United States patent to Hill et al. 3,232,717. Upper support 30 has a tapering upper recess adapted to receive the tapered lower end of the collector 24 of the diode immediately above. Upper support 30 is maintained in concentric relation with but electrically insulated from the collector 24 by an annular ceramic insulator 34. Lower support 32 is maintained in position by a ceramic insulator ring 36. The spacing between the emtter 28 and the collector 24 is filled with a gas mixture which, as later described, is bombarded with fission fragments to produce an interelectrode plasma. The conical cavity between the tapered lower portion of the collector 24 and the lower support 32 may be used as a reservoir 37 for a source of one of the gases in the mixture, for example, liquid cesium and hence the ceramic insulator 36 may be formed to include one or more transport holes 38 communicating the reservoir with the interelectrode gas chamber. According to this invention, the collector 24 is coated on the inside with a thin film 40 of fissile material such as uranium- 235 foil bonded to the collector 24 by a nickel bonding agent as set forth in the copending United States application of Robert F. Hill, Ser. No. 412,685 filed Nov. 29, 1964 now Patent 3,367,022, dated Feb. 6, 1968. The thickness of the uranium film is preferably one fission fragment range which is approximately $5 \times 10^4$ cm. The interelectrode spacing is filled with a gas which is ionizable by fission fragments and may include, for example, any of the gases, argon, krypton, xenon, neon, helium, cesium and nitrogen or specific mixtures thereof as set forth in the copending United States application of Jamerson et al. Ser. No. 498,837 filed Oct. 20, 1965.

Figure 3:
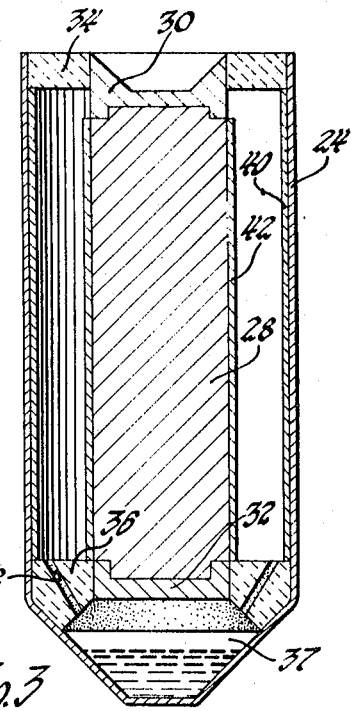
FIGURE 3 is a cross-sectional view of a second embodiment of the thermionic converter according to this invention.

In operation, the reactor will produce a neutron flux which will cause fissioning of the uranium in both the emitter 28 and the film 40 on the collector so that the fission fragments from both the uranium bearing electrodes will enter the interelectrode space to ionize the gas. In addition, the fissioning of the emitter material will cause heating of the emitter so that electrons are emitted from the surface thereof which can travel through the plasma to the collector electrode 24 to generate an EMF. The uranium film 40 on the collector 24 will incidentally become heated by fissioning, but because the mass of the thin film 40 is very small, the amount of heat produced is also small in comparison to that produced within the emitter. The heat from the collector 40 is transferred to the coolant flowing around the converter cells 12. This heat loss accounts for only about 2.6% of the total fission heat generated in the converter cells. In the case where the emitter is composed of $BaO$-$UO_2$-$W$, the $U^{-235}$ is contained entirely within the oxide phase which is distributed throughout the emitter and since only a small amount of the uranium lies close to the surface of the emitter, only a small portion of the fission fragments generated therein escape the emitter surface to effect ionization of the gas. On the other hand, the uranium foil on the collector is very thin and has a high concentration of uranium atoms so that a large portion of the fission fragments from the foil pass into the interelectrode space. It has been calculated that four times the ion generation is obtained with the uranium foil on the collector surface compared to a similar structure but without the uranium foil on the collector. Consequently, then, a significant increase in the current output of a thermionic converter is obtained by this invention.

Where in some instances it is undesirable to allow fission products such as xenon and krypton to escape from the emitter into the interelectrode gas, it is then desirable to clad the emitter with a material impervious to fission products. As shown in FIGURE 3, cladding material 42 surrounds the emitter 28. In all other respects, FIGURE 3 is identical to the structure of FIGURE 2. The cladding material 42 is well known in the art and may comprise molybdenum, tungsten or rhenium, for example when the interelectrode gas contains a significant portion of cesium whereas an alkali metal material such as potassium or lithium are used when no cesium is incorporated in the gas mixture. The cladding 42 will have the effect of shielding emitter originated fission fragments from the interelectrode space so that they cannot contribute to the ionization of the gas. However, as has been explained above, the proportion of fission fragments supplied by the emitter is minor compared to that supplied from the uranium film 40 on the collector. In the event that it is desirable to augment the fission fragments from the collector, uranium or other fissile material will be incorporated in the cladding material 42 or coated upon the entire surface or portions of the surface of the cladding 42. Of course, with such a structure, some fission products will enter the interelectrode space, but the amount of such contamination is minimal compared to that which would be contributed by a massive unclad uranium bearing emitter.

It will thus be seen that this invention provides a means for overcoming the limitation of thermionic converter output due to electron density of the plasma by providing a practical means for augmenting the production rate of fission fragments which are available for ionization of the interelectrode gas. It is further seen that this invention provides means for cladding he predominant portion of the fuel and at the same time retaining an adequate source of fission fragments for ionizing the interelectrode gas.

The embodiments of the invention described herein are for the purposes of illustration and the scope of the invention is intended to be limited only by the following claims:

It is claimed:

1. A noble gas thermionic converter having an emitter and a collector spaced therefrom to define an interelectrode space, a noble gas ionizable by fission fragments in the space, and means for ionizing the gas comprising a source of fission fragments on the collector.

2. A noble gas thermionic converter having an emitter and a collector spaced therefrom to define an interelectrode space, and a noble gas ionizable by fission fragments in the space, the emitter and collector being at least partially composed of fissile material.

3. A noble gas thermionic converter comprising a spaced emitter and collector, a gas ionizable by fission fragments therebetween, said gas being predominantly a noble gas, the emitter including fissile material for supplying heat to the emitter and for supplying fission fragments to the gas to ionize the gas, and means for further ionizing the gas including a thin film of fissile material on the collector, the film having a thickness approximately equivalent to one fission fragment range.

4. A noble gas thermionic converter comprising an emitter electrode and a collector electrode displaced therefrom to form an interelectrode space, a gas ionizable by fission fragments in the interelectrode space, said gas comprising predominantly a noble gas, the emitter electrode comprising a body of fissile material clad with material impervious to fission fragments, and the collector electrode having a thin coating of fissile material.

5. In a nuclear device containing a critical mass of fissile material to sustain a chain nuclear reaction, apparatus for converting nuclear energy to electrical energy comprising a noble gas thermionic cell having an emitter containing a fissile material, and a conductive collector in spaced relationship with and electrically insulated from said emitter, the collector having a thin coating of fissile material, and a noble gas between said emitter and collector ionizable by fission fragments from said collector, and means for cooling the collector.

6. In a nuclear device as defined in claim 5 wherein the gas is further ionizable by fission fragments from the emitter.

7. In a nuclear device as defined in claim 5 wherein the emitter is clad with a material impervious to fission fragments.

8. A device for converting nuclear energy to electrical energy comprising a noble gas thermionic cell having an emitter containing fissile material, a collector having a thin coating of fissile material spaced from the emitter, a noble gas ionizable by fission fragments between the emitter and collector, means for cooling the collector, and means for establishing a field of neutron flux through said material to cause fissioning of said material.

References Cited

UNITED STATES PATENTS

| | | | |
|---|---|---|---|
| 3,093,567 | 1/1963 | Jablonski et al. | 176—39 X |
| 3,218,487 | 11/1965 | Pidd et al. | 176—39 X |
| 3,321,646 | 5/1967 | Grover et al. | 176—39 X |
| 3,330,974 | 7/1967 | Wilson | 176—39 X |

REUBEN EPSTEIN, Primary Examiner

U.S. Cl. X.R.

310—4